(12) United States Patent
Barnett et al.

(10) Patent No.: US 9,024,230 B2
(45) Date of Patent: May 5, 2015

(54) METHOD FOR STARTING A MULTI-GAS PLASMA ARC TORCH

(75) Inventors: Daniel Wayne Barnett, Plainfield, NH (US); Nakhleh Hussary, Grantham, NH (US)

(73) Assignee: Victor Equipment Company, Denton, TX (US)

(*) Notice: Subject to any disclaimer, the term of this patent is extended or adjusted under 35 U.S.C. 154(b) by 102 days.

(21) Appl. No.: 13/446,360

(22) Filed: Apr. 13, 2012

(65) Prior Publication Data

US 2012/0261392 A1 Oct. 18, 2012

Related U.S. Application Data

(60) Provisional application No. 61/475,269, filed on Apr. 14, 2011.

(51) Int. Cl.
*B23K 9/00* (2006.01)
*B23K 10/00* (2006.01)
*B23K 9/067* (2006.01)
*H05H 1/34* (2006.01)

(52) U.S. Cl.
CPC ............ *B23K 9/0678* (2013.01); *B23K 10/006* (2013.01); *H05H 1/3405* (2013.01); *H05H 2001/3421* (2013.01); *H05H 2001/3426* (2013.01); *H05H 2001/3436* (2013.01); *H05H 2001/3457* (2013.01)

(58) Field of Classification Search
CPC .. B23K 9/0678; B23K 10/006; H05H 1/3405; H05H 2001/3457; H05H 2001/3426; H05H 2001/3436; H05H 2001/3421
USPC ............... 219/121.55, 121.57, 76.16, 121.36, 219/121.37, 121.38, 121.39, 121.4, 121.41, 219/121.42, 121.43, 121.44, 121.45, 219/121.46, 121.47, 121.48, 121.5, 121.51, 219/121.52, 121.53, 121.54, 121.56, 121.58
See application file for complete search history.

(56) References Cited

U.S. PATENT DOCUMENTS

| | | | | |
|---|---|---|---|---|
| 3,644,782 | A * | 2/1972 | Sheer et al. | 315/111.21 |
| 4,791,268 | A * | 12/1988 | Sanders et al. | 219/121.57 |
| 4,916,283 | A * | 4/1990 | Nagasaka et al. | 219/121.51 |
| 5,166,494 | A * | 11/1992 | Luo et al. | 219/121.55 |
| 5,414,237 | A * | 5/1995 | Carkhuff | 219/121.51 |

(Continued)

FOREIGN PATENT DOCUMENTS

EP 0 794 697 9/1997

OTHER PUBLICATIONS

International Search Report and Written Opinion for PCT/US2012/033504; dated Jul. 20, 2012.

*Primary Examiner* — Dana Ross
*Assistant Examiner* — Gyounghyun Bae
(74) *Attorney, Agent, or Firm* — Kacvinsky Daisak Bluni PLLC

(57) ABSTRACT

A method of starting a multi-gas plasma arc torch for cutting a workpiece is provided that includes directing a pre-flow gas within the plasma arc torch and switching the pre-flow gas to a plasma gas before a pilot arc is transferred to the workpiece. The plasma gas is supplied initially at a first gas pressure when the pre-flow gas is switched to the plasma gas. The gas pressure is switched to a second gas pressure that is different than the first gas pressure after the pilot arc is transferred. The method provides a smooth transition from the pre-flow gas to the plasma gas and reduces the time delay in replacing the pre-flow gas with the plasma gas in the plasma arc torch, thereby improving cut or marking quality.

18 Claims, 8 Drawing Sheets

(56) References Cited

U.S. PATENT DOCUMENTS

| | | | |
|---|---|---|---|
| 5,424,507 A * | 6/1995 | Yamaguchi | 219/121.44 |
| 5,506,384 A * | 4/1996 | Yamaguchi | 219/121.57 |
| 5,548,097 A * | 8/1996 | Couch et al. | 219/121.57 |
| 5,591,357 A * | 1/1997 | Couch, Jr. et al. | 219/121.39 |
| 5,653,895 A * | 8/1997 | Shintani | 219/121.5 |
| 5,695,662 A * | 12/1997 | Couch et al. | 219/121.39 |
| 5,717,187 A * | 2/1998 | Rogozinski et al. | 219/121.54 |
| 5,990,443 A * | 11/1999 | Tatham et al. | 219/121.57 |
| 6,163,009 A * | 12/2000 | Hardwick et al. | 219/121.54 |
| 6,326,583 B1 * | 12/2001 | Hardwick et al. | 219/121.55 |
| 6,498,317 B2 * | 12/2002 | Hardwick | 219/121.54 |
| 6,670,572 B2 * | 12/2003 | Norris et al. | 219/121.57 |
| 6,677,551 B2 * | 1/2004 | Hardwick | 219/121.54 |
| 6,933,463 B2 * | 8/2005 | Yamaguchi et al. | 219/121.57 |
| 6,960,737 B2 * | 11/2005 | Tatham | 219/121.5 |
| 7,087,856 B2 * | 8/2006 | Eldridge | 219/121.54 |
| 7,326,875 B2 * | 2/2008 | Krink et al. | 219/121.59 |
| 2003/0141286 A1 | 7/2003 | Yamaguchi | |
| 2003/0164359 A1 * | 9/2003 | Norris et al. | 219/121.57 |
| 2005/0045600 A1 * | 3/2005 | Tatham | 219/121.51 |
| 2005/0173381 A1 | 8/2005 | Delzenne | |
| 2006/0108333 A1 * | 5/2006 | Picard et al. | 219/121.62 |
| 2006/0186094 A1 * | 8/2006 | Krink et al. | 219/121.55 |
| 2008/0210670 A1 * | 9/2008 | Brandt et al. | 219/121.55 |
| 2008/0302767 A1 * | 12/2008 | Yamaguchi et al. | 219/121.44 |
| 2009/0032502 A1 * | 2/2009 | Eickhoff et al. | 219/121.36 |
| 2010/0243619 A1 * | 9/2010 | Currier et al. | 219/121.48 |
| 2011/0155702 A1 * | 6/2011 | Winn | 219/121.51 |

* cited by examiner

METHOD FOR STARTING A MULTI-GAS PLASMA ARC TORCH

CROSS-REFERENCE TO RELATED APPLICATIONS

This application claims the benefit of U.S. Application No. 61/475,269 filed on Apr. 14, 2011. The disclosure of the above application is incorporated herein by reference.

FIELD

The present disclosure relates to plasma arc torches and more specifically to methods of starting multi-gas plasma arc torches for improved cutting quality.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

In automated plasma arc torch applications, the plasma arc torches operate at current levels from 4 amps to 1,000 amps or more. In multi-gas automated plasma arc torch applications, a pre-flow gas of a relatively less reactive gas is directed to initiate a pilot arc and is switched to a plasma gas of a relatively reactive gas as the arc current ramps up to the full cutting current after the pilot arc is transferred to the workpiece. Because it takes time to completely replace the pre-flow gas in the plasma arc torch with the plasma gas, the cut quality can be poor at the start of the cutting operation when the pre-flow gas is still present in the plasma arc torch. For example, the workpiece may include excessive dross, wide kerf width and large cut surface angles. This is particularly problematic for low current processes (about 50 amperes and less), which have a relatively small nozzle orifice size (less than about 0.040 inches), processes with higher pre-flow pressure (>40 psi) or processes that have low plasma pressures (<60 psi) such as plasma marking.

SUMMARY

In one form of the present disclosure, a method of starting a plasma arc torch for cutting a workpiece includes directing a pre-flow gas within the plasma arc torch, switching to a plasma gas that is different from the pre-flow gas, transferring the pilot arc to the workpiece after the pre-flow gas is switched to the plasma gas, and then changing the pressure of the plasma gas to a value that is preferred during the cutting or marking operation. The pilot arc may be generated within the prior art torch after switching to the plasma gas from the preflow gas in one form of the present disclosure. In another form, the pilot arc is generated within the plasma arc torch before switching to the plasma gas from the preflow gas, and the pilot arc is not permitted to transfer to the workpiece until after a time delay has elapsed.

In another form of the present disclosure, a method of starting a plasma arc torch for cutting a workpiece includes: directing a pre-flow gas; switching from the pre-flow gas to a plasma gas; supplying the plasma gas at a first gas pressure; transferring a pilot arc to the workpiece after the pre-flow gas is switched to the plasma gas; and switching the plasma gas from the first gas pressure to a second gas pressure that is higher or lower than the first gas pressure after the pilot arc is transferred to the workpiece. The second gas pressure is higher for a cutting operation, and for a marking operation, the second gas pressure is lower.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 7:
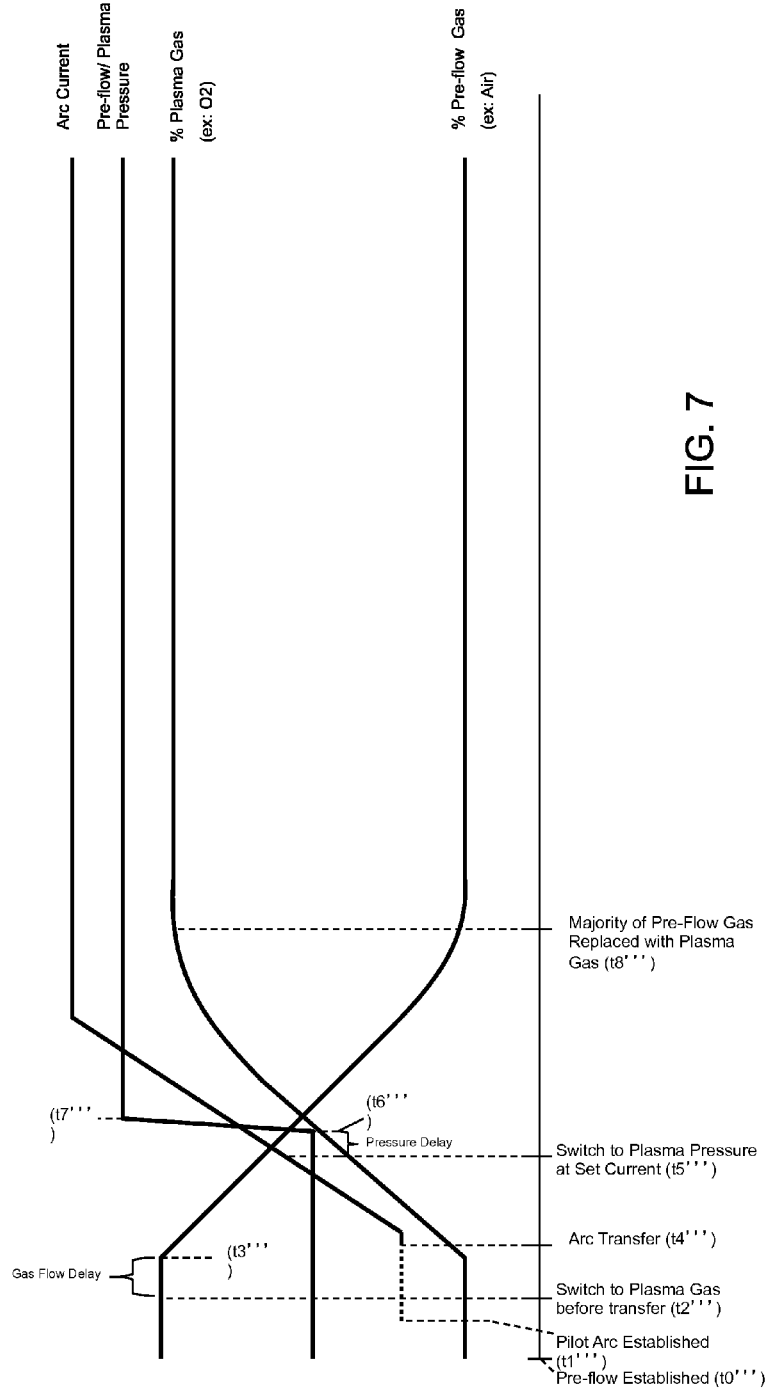
Figure 8:
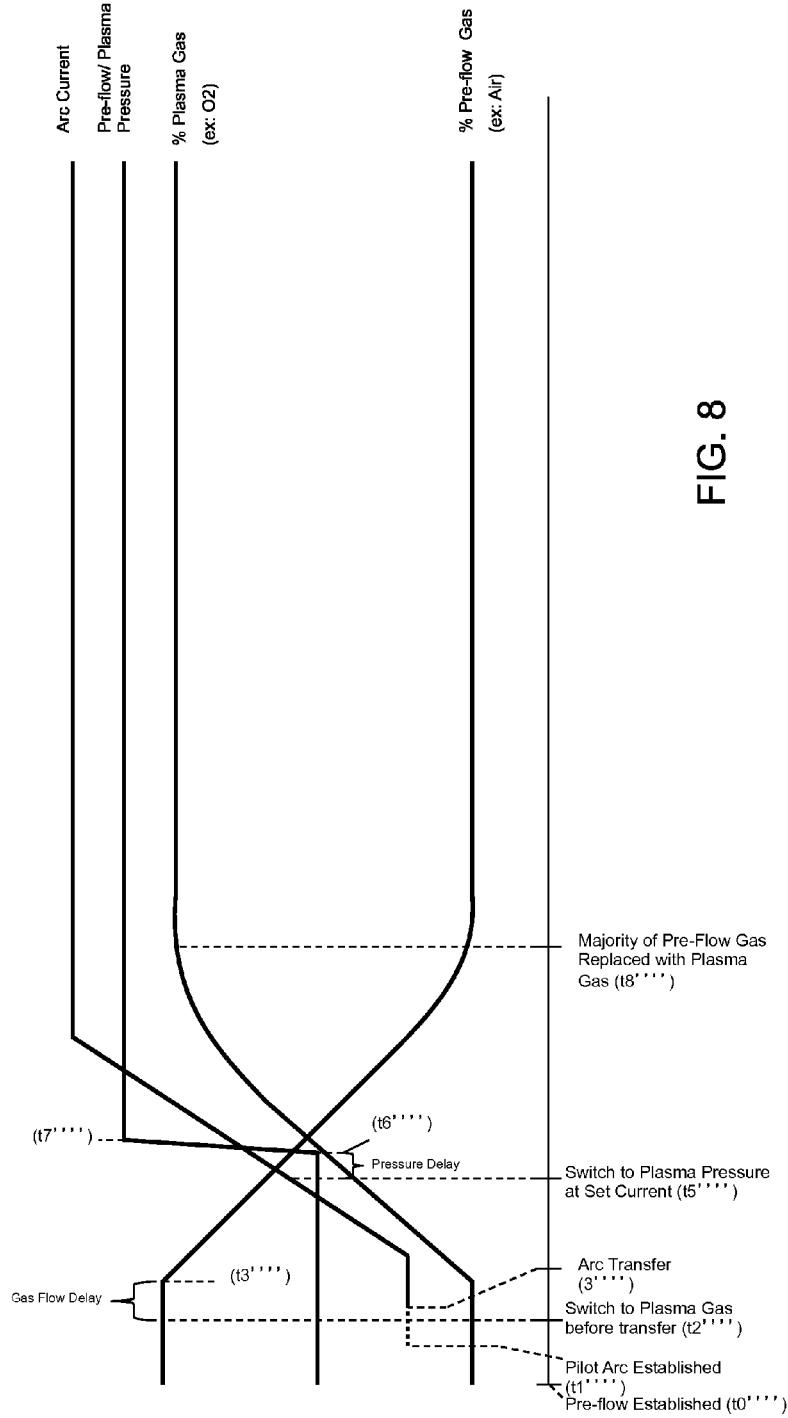

FIG. 7 is a graph illustrating the sequence of gas flow/pressure and arc current in a plasma arc torch when the plasma arc torch is operated by yet another method having extended pilot time in accordance with the principles of the present disclosure; and FIG. 8 is a graph illustrating the sequence of gas flow/pressure and arc current in a plasma arc torch when the plasma arc torch is operated by a method having extended current ramp delay in accordance with the principles of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
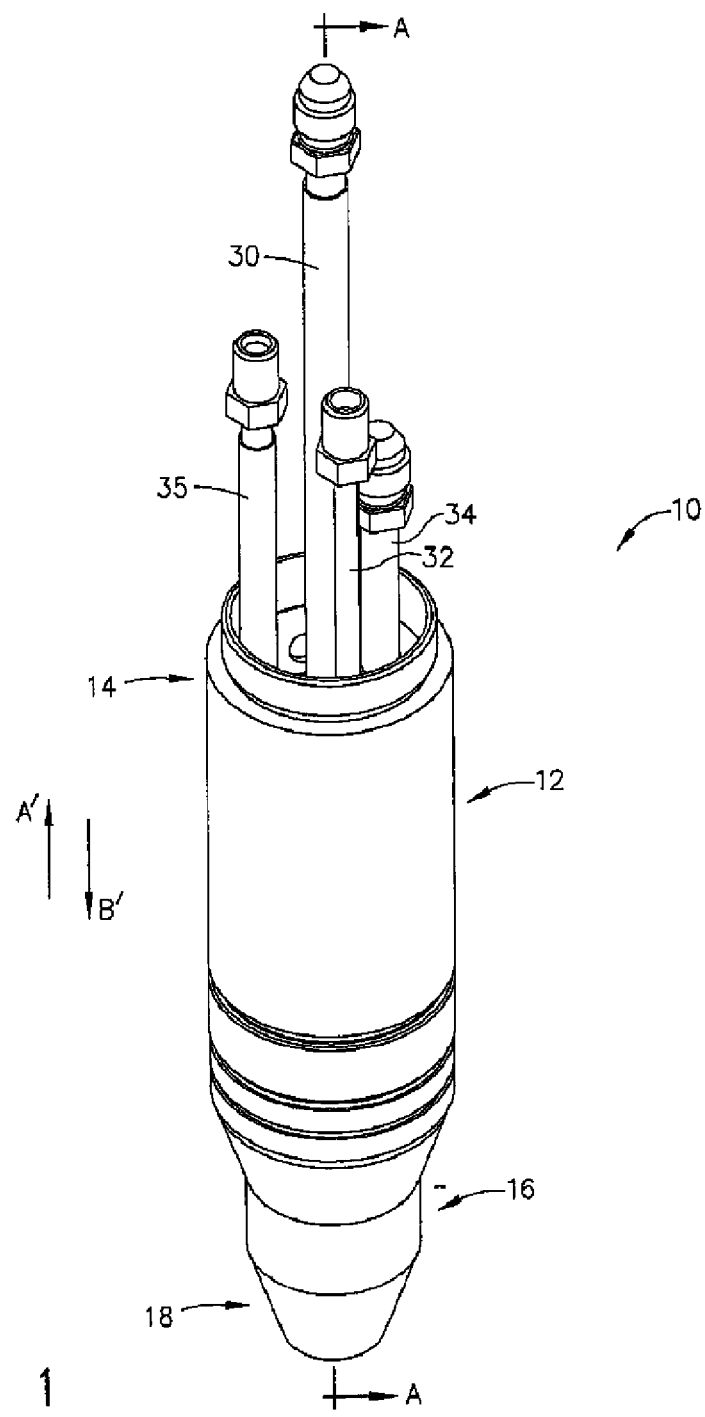
FIG. 1 is a perspective view of a prior art plasma arc torch.
Figure 2:
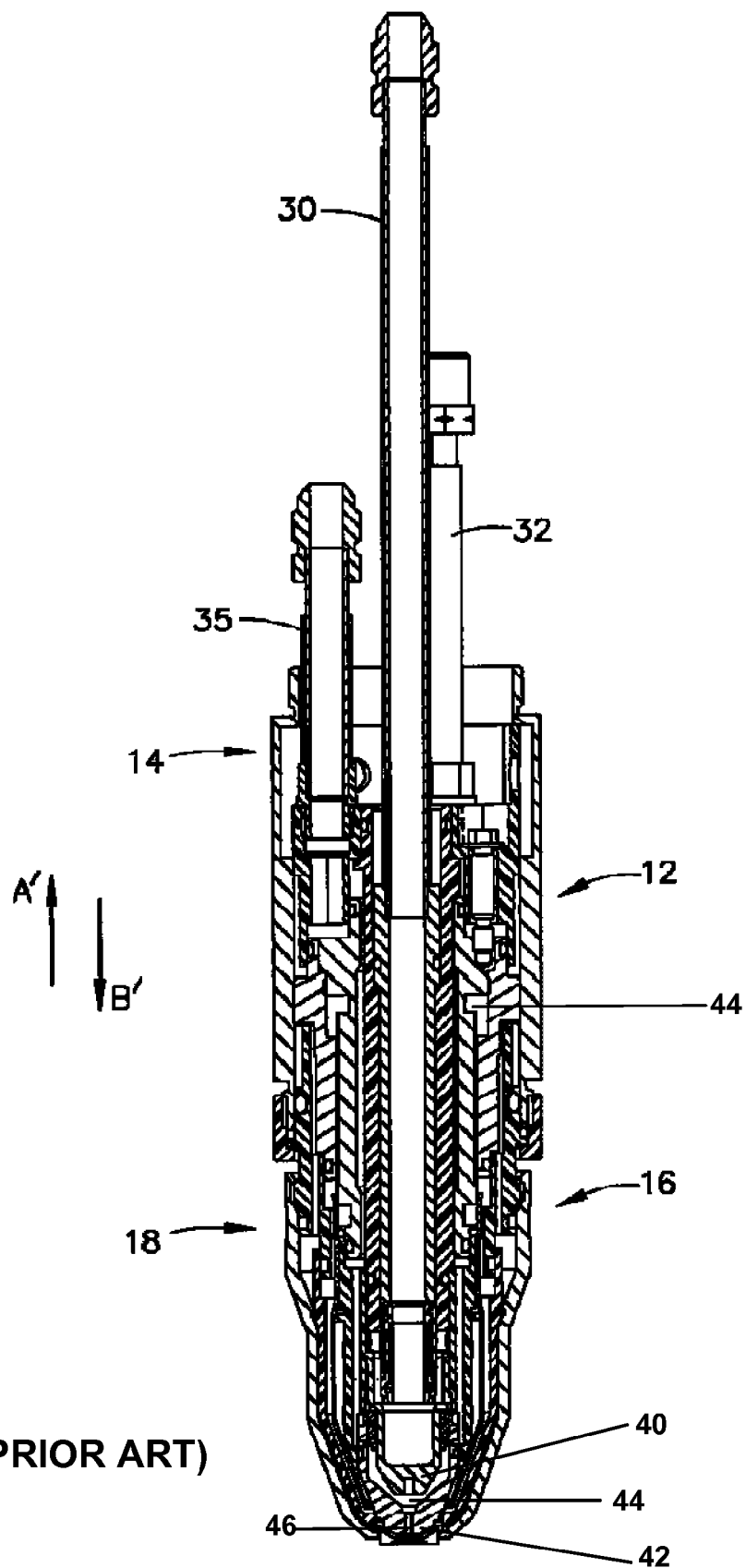
FIG. 2 is a longitudinal cross-sectional view, taken along line A-A of FIG. 1, of the prior art plasma arc torch.

Referring to the drawings, a prior art plasma arc torch is illustrated and indicated by reference numeral 10 in FIGS. 1 and 2. The plasma arc torch 10 generally comprises a torch head 12 disposed at a proximal end 14 of the plasma arc torch 10 and a consumables cartridge 16 secured to the torch head 12 and disposed at a distal end 18 of the plasma arc torch 10 as shown.

As used herein, a plasma arc torch should be construed by those skilled in the art to be an apparatus that generates or uses plasma for cutting, welding, spraying, gouging, or marking operations, among others, whether manual or automated. Accordingly, the specific reference to plasma arc cutting torches or plasma arc torches should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, proximal direction or proximally is the direction towards the torch head 12 from the consumable cartridge 16 as depicted by arrow A', and distal direction or distally is the direction towards the consumable components 16 from the torch head 12 as depicted by arrow B'.

As shown, the torch head 12 is adjoined with a coolant supply tube 30, a plasma gas tube 32, a coolant return tube 34, and a secondary gas tube 35. Pre-flow gas is supplied to the plasma arc torch 10 through the plasma gas tube 32 to initiate a pilot arc, whereas plasma gas is supplied to the plasma arc torch 10 through the plasma gas tube 32 to generate a plasma arc for cutting. Secondary gas is supplied to the plasma arc torch 10 through the secondary gas tube 35 to increase the efficiency and efficacy of the torch cutting process. A cooling fluid is supplied to and returned from the plasma arc torch 10 through the coolant return tube 34 to cool the plasma arc torch 10 during operation.

The consumables 16 includes an electrode 40 that is in electrical communication with the negative side of a power supply (not shown) and a tip 42 that is in electrical communication with the positive side of the power supply (not shown). The tip 42 is electrically separated from the electrode 40. A plasma chamber 44 is formed between the electrode 40 and the tip 42. The tip 42 further comprises a central exit orifice 46, through which a plasma stream exits during operation of the plasma arc torch 10 as the plasma gas is ionized within the plasma chamber 44.

The torch head 12 includes various components that define a plasma gas conduit 48 in fluid communication with the plasma chamber 44 and the plasma gas tube 32 such that the pre-flow gas and the plasma gas may be supplied, through the plasma gas tube 32 and the plasma gas conduit 48, and into the plasma chamber 44. The plasma gas conduit 48 may be defined by a plurality of components and be configured differently depending on applications of the plasma arc torch 10. Exemplary operation of such a plasma arc torch is set forth in greater detail in U.S. Pat. No. 7,019,254, which is commonly owned with the present application and the contents of which are incorporated herein by reference in their entirety.

Typically, to start a multi-gas plasma arc torch 10, an electrical current is first applied to the electrode 40, typically a cathode, and the tip 42, typically an anode. A pre-flow gas is supplied from a pre-flow gas source, through the plasma gas tube 32 and the plasma gas conduit 48, and into the plasma chamber 44. The pre-flow gas is ionized to generate a pilot arc between the electrode 40 and the tip 42. Thereafter, the pilot arc is transferred to a workpiece and a plasma gas is then supplied from a plasma gas source, through the plasma gas tube 32 and the plasma gas conduit 48, and into the plasma chamber 44, to generate the plasma stream. The pre-flow gas is generally less reactive, such as nitrogen, argon and air. The plasma gas is generally relatively reactive, such as oxygen.

Figure 3:
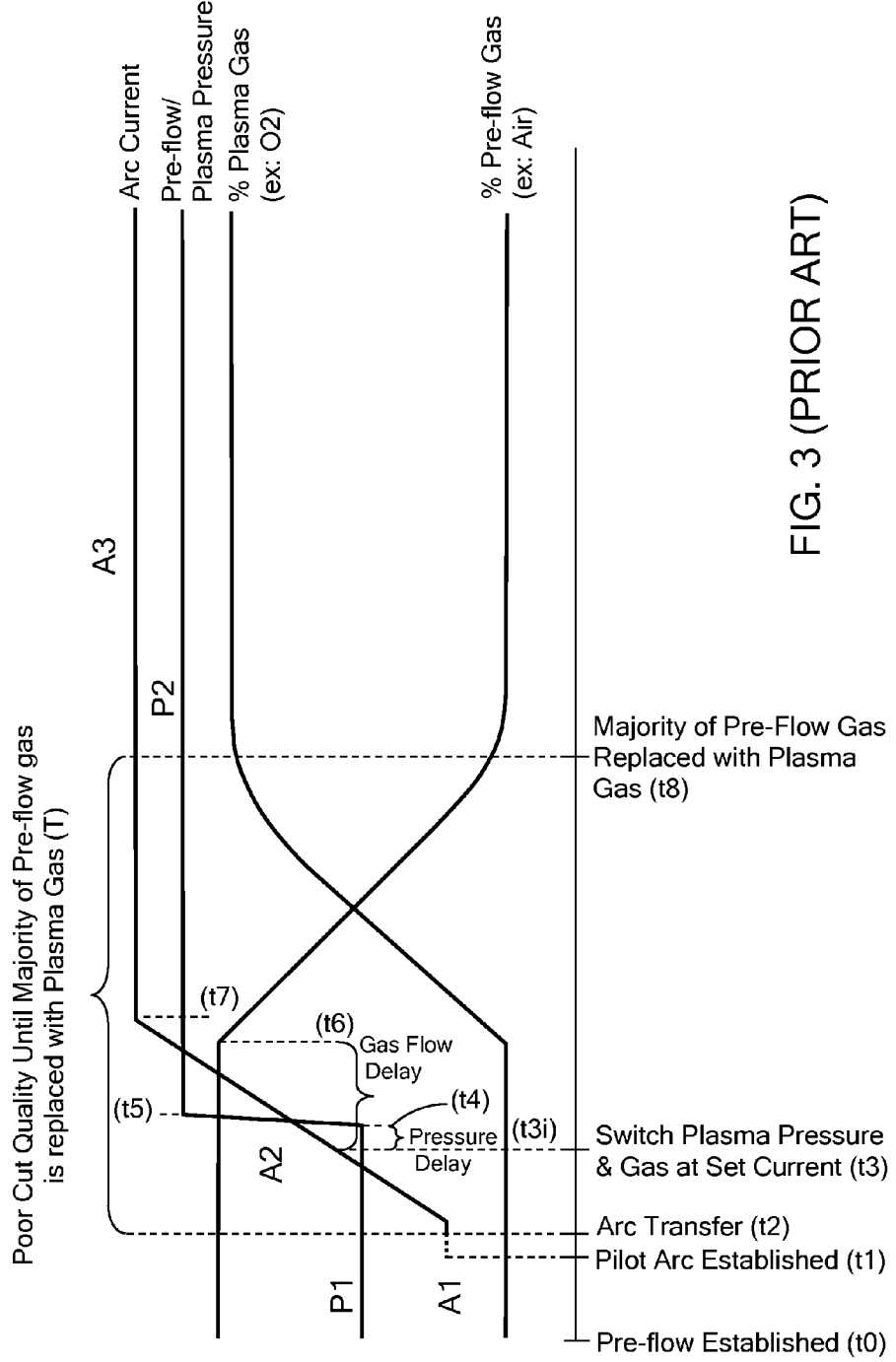
FIG. 3 is a graph illustrating the sequence of gas flow/pressure and arc current in a plasma arc torch when the plasma arc torch is started by a prior art method.

More specifically, FIG. 3 illustrates the sequence of gas flow/pressure and arc current in a plasma arc torch 10 when the plasma arc torch 10 is started by a prior art method. To start the plasma arc torch 10, an electrical current is applied to the electrode 40 and the tip 42 and a pre-flow gas is supplied at a first pressure P1 to the plasma arc torch 10. A pilot arc is thus generated between the electrode 40 and the tip 42 at time t1. Next, the pilot arc is transferred to the workpiece at an arc current value A1 at time t2. The arc current then ramps up during a ramp period A2. During the ramp period A2, the pre-flow gas is switched to the plasma gas and the gas pressure starts to increase at time t3. The plasma arc torch 10 still contains 100% pre-flow gas when the pre-flow gas is switched to the plasma gas due to the distance from the plasma gas source, through the plasma gas supply tube 32 and the plasma gas conduit 48, to the plasma chamber 44. The pre-flow gas in the plasma gas conduit 48, particularly proximate the proximal end 14 of the plasma arc torch 10, starts to be replaced with the plasma gas at time t6. The arc current continues to ramp up until the arc current reaches a third set value A3 at time t7. At time t3, the pressure is switched from P1 to P2, and an additional time delay occurs, t3i, which is the time for the pressure to begin changing in the arc chamber, i.e., the pressure delay shown. The arc current is maintained at the third set value A3. The plasma gas continues to increase and the pre-flow gas continues to decrease in the plasma gas conduit 48 of the plasma arc torch 10 until time t8 when the pre-flow gas is completely replaced with the plasma gas.

As shown, in the prior art method, it takes significant time to transition the plasma arc torch 10 from the pre-flow stage to the cutting stage with all operating parameters (for example, with respect to arc current, gas type and gas pressure) met for optimum cutting quality. The time delay in replacing the pre-flow gas with the plasma gas in the plasma gas conduit 48 can result in poor cut quality during this period T (from t2 to t8). As shown, the cutting operation starts as soon as the arc transfer occurs at time t2, whereas all operating parameters for optimum cutting quality are met at time t8. Longer time delays are expected when the plasma arc torch 10 has a small tip orifice 46 (FIG. 2) or is operated at low amperage, a relatively high pre-flow pressure or low plasma pressure.

Figure 4:
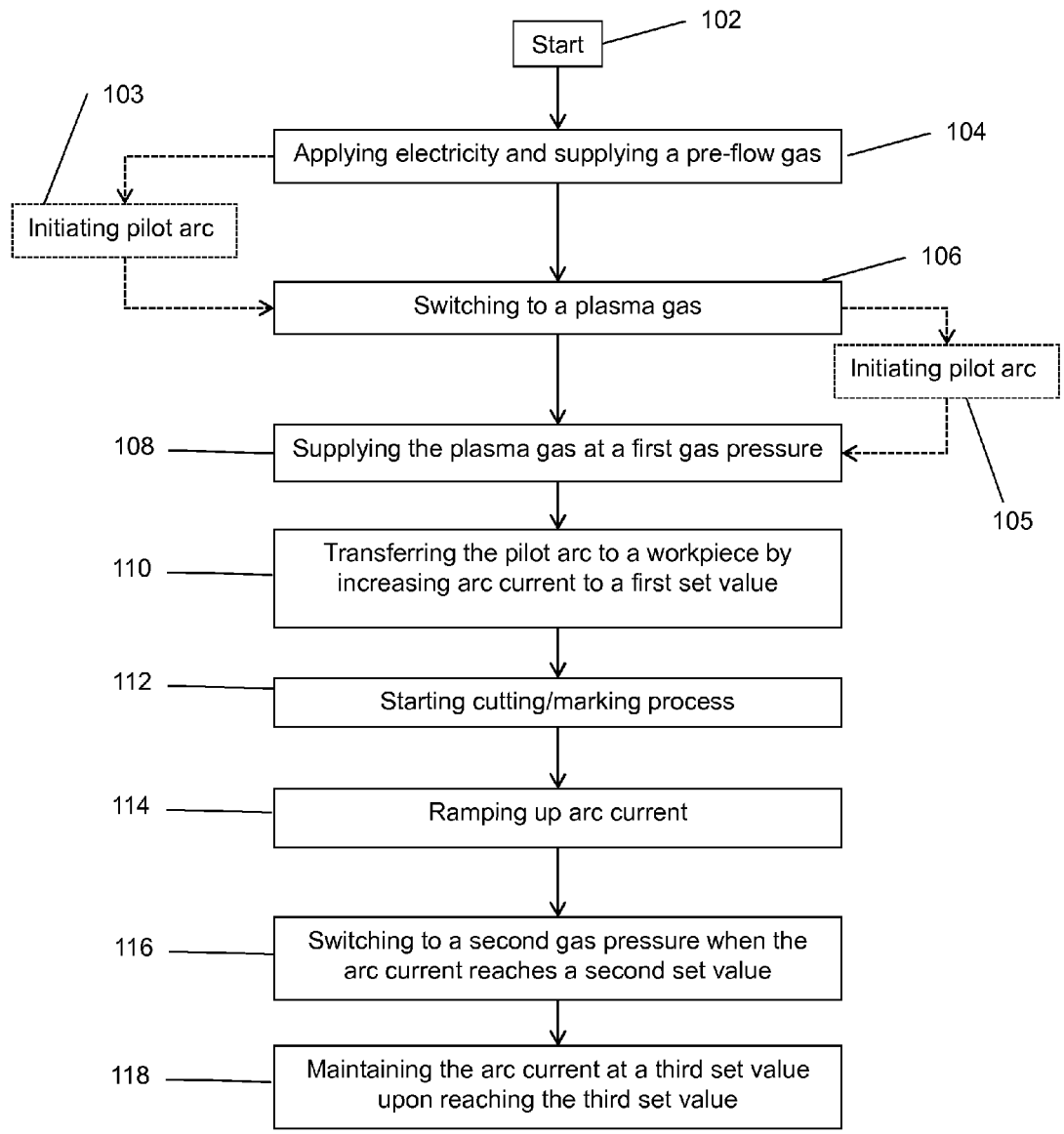
FIG. 4 is a flow diagram of various methods of starting a plasma arc torch for cutting or marking a workpiece in accordance with the principles of the present disclosure.

Referring to FIG. 4, various methods 100 of operating a plasma arc torch 10 for cutting a workpiece in accordance with the principles of the present disclosure starts at step 102. Current is applied to the electrode 40 and the tip 42 and a pre-flow gas is directed to the plasma arc torch 10 in step 104. Next, the pre-flow gas is switched to the plasma gas in step 106. As shown by the dashed lines to the left and right, the pilot arc may be initiated within the plasma arc torch either before switching to a plasma gas (103), or after switching to the plasma gas (105). The plasma gas is supplied at a first pressure P1 in step 108. Thereafter, the pilot arc is transferred to the workpiece to initiate a plasma stream when the arc current is increased to a first set value A1 in step 110. The cutting or marking process thus starts in step 112. As soon as the arc current is increased to the first set value A1, the arc current ramps up in step 114. The plasma gas is increased or switched to a second pressure P2 that is higher than the first pressure P1 for cutting when the arc current reaches a second set value A2 in step 116. For marking operations, the second pressure P2 is lower than the first pressure P1. The arc current is maintained at a third set value A3 upon reaching the third set value A3 in step 118.

Figure 5:
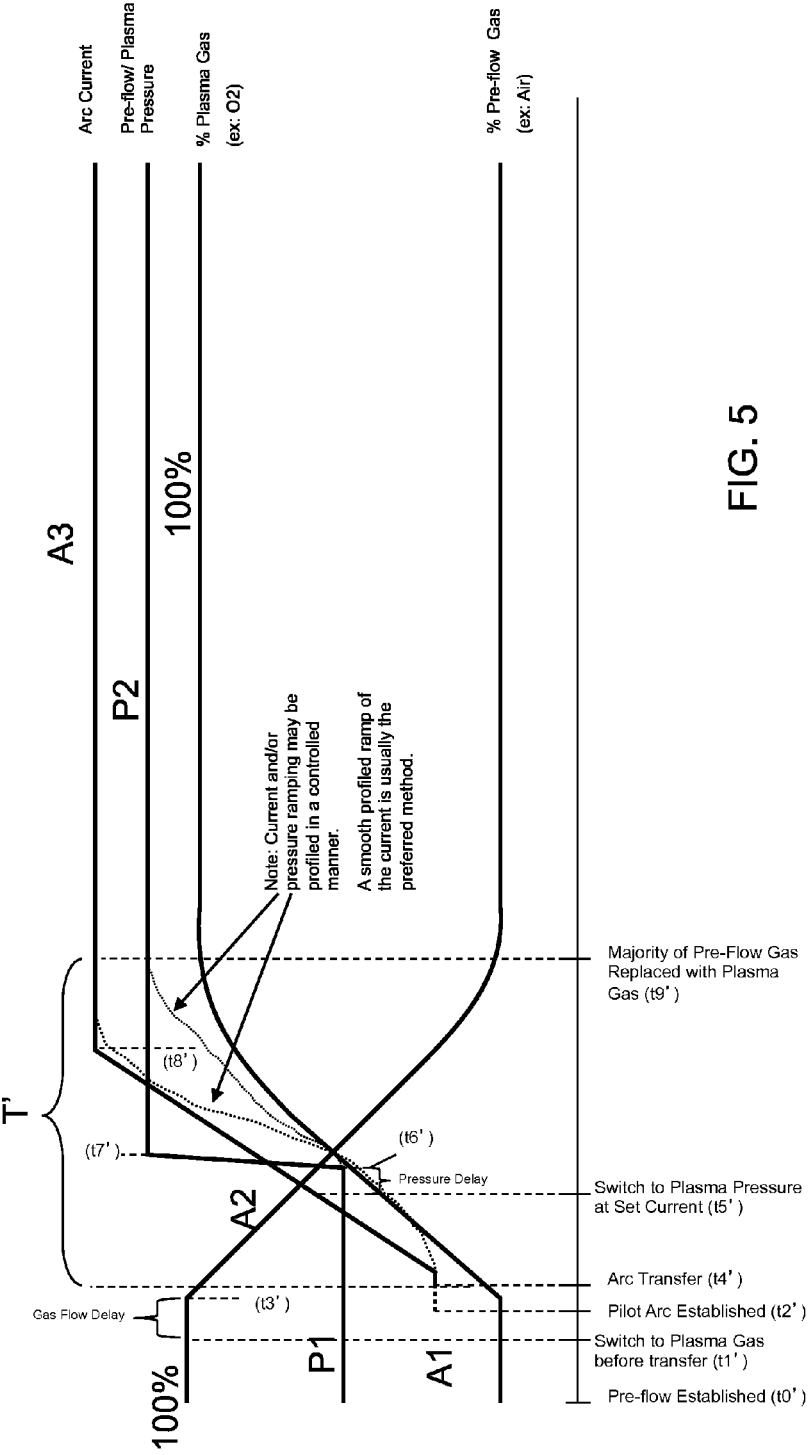
FIG. 5 is a graph illustrating the sequence of gas flow/pressure and arc current in a plasma arc torch when the plasma arc torch is operated by a method in accordance with the principles of the present disclosure.

FIG. 5 illustrates the sequence of gas flow/pressure and arc current in a plasma arc torch 10 when the plasma arc torch 10 is started by a method in accordance with the principles of the present disclosure. As shown, pre-flow gas is initiated at time t0', and a pilot arc is generated at time t2' when electricity is applied to the plasma arc torch and a pre-flow gas is directed to the plasma arc torch 10 at a first pressure P1. In a particularly advantageous form of the present disclosure, the pre-flow gas is switched to the plasma gas at time t1', prior to establishing the pilot arc at time t2'. As previously set forth, in another form of the present disclosure, the pilot arc may be established before the pre-flow gas is switched to the plasma gas. In one form, the plasma gas is supplied at a pressure equal to the first pressure P1, although the plasma gas pressure may be higher or lower than the pre-flow gas pressure P1. When the pre-flow gas is switched to the plasma gas, the pre-flow gas remains in the plasma gas conduit 48 of the plasma arc torch 10. After the gas has been switched to plasma gas, the pilot arc is then transferred to the workpiece at time t4' and at an arc current of a first set value A1. Although the pilot arc current and the transfer arc current are shown to be the same at the value A1, it should be understood that these current values may be different while remaining within the scope of the present disclosure. In one form, time t1' is set to be approximately 10-1000 ms before time t2'. When the arc transfer occurs, the plasma arc is ignited to consume a substantial amount of the pre-flow gas remaining in the plasma gas conduit 48 of the plasma arc torch 10. Therefore, the pre-flow gas within the plasma gas conduit 48 is substantially replaced with the plasma gas when the plasma stream is generated. Next, the arc current ramps up from the first set value A1 during a ramp period A2. During the ramp period A2, the plasma gas is switched from the first pressure P1 to a second pressure P2 that is higher than the first pressure P1 at time t5'. The gas pressure reaches the second pressure P2 at time t7'. The arc current continues to ramp up until the arc current reaches a third set value A3 at time t8'. The arc current is maintained at the third set value A3. The plasma gas continues to be supplied to the plasma arc torch 10. The pre-flow gas is completely replaced with the plasma gas at time t9'. The desired operating parameters (with respect to arc current, gas type, gas pressure) for optimum cutting are met at time t9'.

As shown, the time delay T' from the time arc transfer occurs (t4') to the time when the pre-flow gas is completely replaced with the plasma gas (t9') is reduced, resulting in improved cut quality at the start of the cutting process. More specifically, in the method of the present disclosure, the pre-flow gas is switched to the plasma gas before the gas pressure is switched to a higher pressure P2 because it takes longer to switch the type of gas than to switch the gas pressure, particularly for a plasma arc torch with a small tip orifice. The pre-flow gas is switched to the plasma gas prior to arc transfer, whereas the gas pressure is switched from a lower gas pressure P1 to a higher gas pressure P2 after arc transfer. The pre-flow pressure is typically set at a lower pressure than the plasma gas in order to decrease electrode wear caused by high velocity gas flow at the emissive insert of the electrode and to reduce tip wear resulting from arc instability. In the method of the present disclosure, when the arc transfer occurs and the cutting operation starts, the pre-flow gas is already switched to the plasma gas. The arc transfer causes ignition of a plasma arc that consumes a substantial amount of the pre-flow gas remaining in the plasma gas conduit 48 of the plasma arc torch 10. As a result, the plasma gas can more quickly replace the pre-flow gas in the plasma arc torch 10, thereby reducing the time delay in supplying the plasma gas to the plasma chamber 44. The plasma arc torch 10 can be more quickly transitioned from the pre-flow stage to the optimum cutting stage with the desired operating parameters met for optimum cutting.

The method of starting the plasma arc torch is particularly advantageous for a plasma arc torch, for example, having a tip orifice smaller than about 0.050 inches, or a pre-flow gas at a pressure greater than about 40 psi, or a plasma pressure less than about 60 psi, or a relatively low operating amperage from approximately 10 amp to 150 amp. Moreover, the time to switch to arc voltage control is reduced. For example, with a 15 amp oxygen plasma cutting process, the arc voltage control delay was reduced from 2 seconds to 0.5 seconds by using the method of starting the plasma arc torch 10 of the present disclosure. Further, the method according to the present disclosure reduces possibility of arc transfer loss. It should be understood that the values presented and described herein for the tip orifice size, the gas pressures, and the operating amperages are merely exemplary and should not be construed as limiting the scope of the present disclosure.

As further shown in FIG. 5, it should be understood that the current and/or the pressure ramping may be profiled in controlled manner, and thus are not limited to the linear ramping as set forth herein. Such controlled profiling shall be understood to be within the teachings of the present disclosure.

Figure 6:
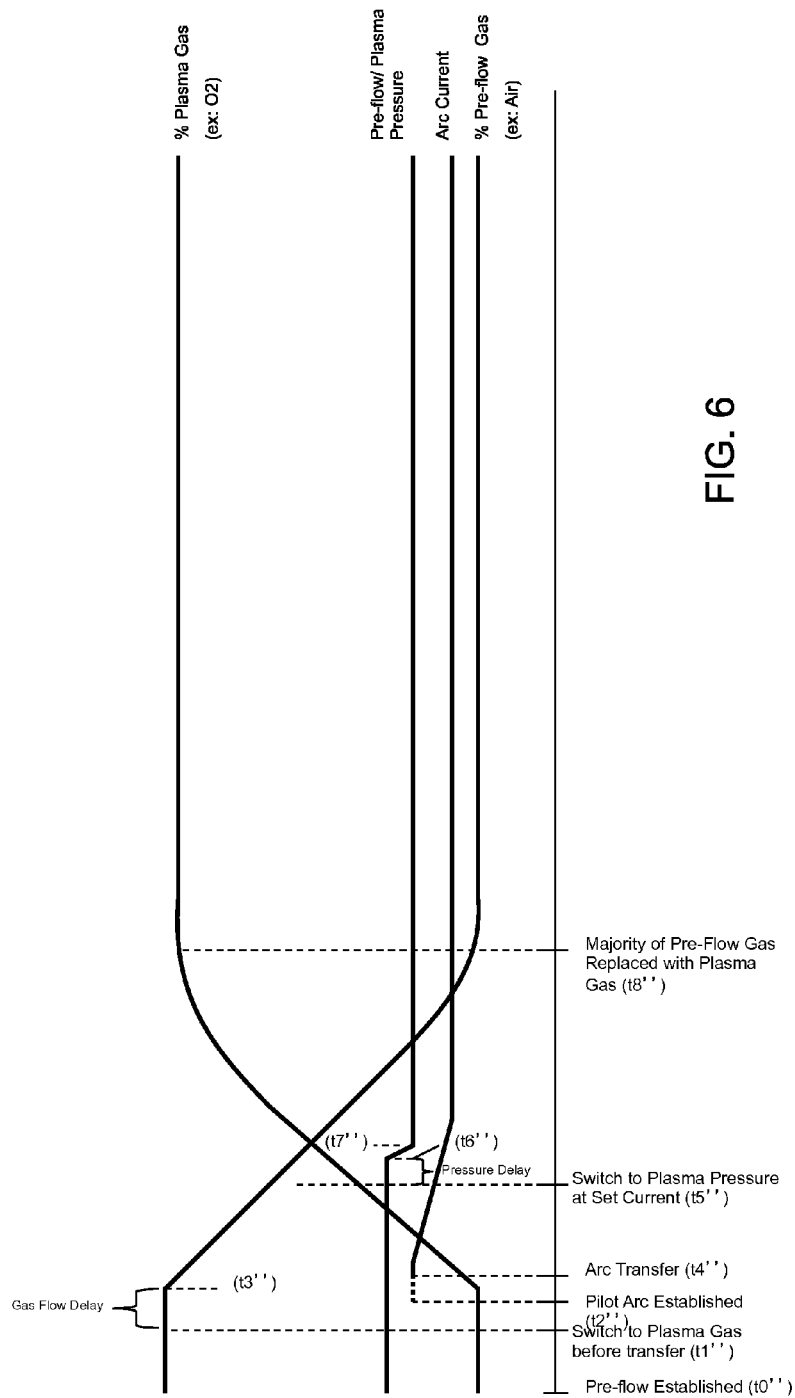
FIG. 6 is a graph illustrating the sequence of gas flow/pressure and arc current in a plasma arc torch when the plasma arc torch is used for marking operations in accordance with the principles of the present disclosure.

Referring now to FIG. 6, another method for marking operations with a plasma arc torch is illustrated. As shown, the plasma pressure is decreased at time t7" after the pre-flow gas is switched to plasma gas at time t5", and the arc current is also decreased after arc transfer t4". As set forth above, the pilot arc may be established within the plasma arc torch either before or after the switch from pre-flow gas to plasma gas. Therefore, the illustration showing the switch to plasma gas before establishing the pilot arc should not be construed as limiting the scope of the present disclosure.

As shown in FIG. 7, yet another method of the gas advance method is illustrated with extended pilot time. More specifically, a delay exists between time t2''' when the switch is made to plasma gas and before arc transfer t4'''. Such an extended pilot time is useful for lower amperages, such as 15 amps by way of example, when the pilot arc is smaller and is more easily extinguished by a sudden increase in plasma gas pressure.

In FIG. 8, yet another variation of the inventive method is illustrated, wherein an extended current ramp delay occurs. More specifically, a delay occurs after arc transfer t3"" before the arc current is ramped up in order to maintain the integrity of the pilot arc for transfer to the workpiece as the plasma gas is increased.

In still another form of the present disclosure, it is contemplated that an external anode rather than the conventional tip 42 be employed to transfer the pilot arc with the methods as described above in order to improve consumables life. During operation, the pilot arc would be transferred to the external anode rather than the tip 42, and after the pre-flow is switched to plasma gas and the plasma gas pressure is increased, the arc would then be transferred to the tip and then the workpiece. Such constructions with an external, or secondary anode element, should be construed as falling within the scope of the present disclosure.

It should be understood that the teachings of the present disclosure contemplate relatively low amperage torches and such torches with multiple, i.e. two or more, gas supplies. The methods of the present disclosure are particularly useful with torches having an operating current of less than about 50 amps, although a range of about 4 amps to about 1000 amps may be employed according to the teachings of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of starting a plasma arc torch for operating on a workpiece, the method comprising:
   providing a pre-flow gas supply and a plasma gas supply from two different gas sources;
   directing the pre-flow gas supply within the plasma arc torch;
   initiating a pilot arc within the plasma arc torch;
   switching to the plasma gas supply to reduce a time delay when the pre-flow gas is completely replaced with the plasma gas within the plasma arc torch;
   transferring a pilot arc to the workpiece after the pre-flow gas supply is switched to the plasma gas supply; and
   adjusting the pressure of the plasma gas supply after the pilot arc is transferred to the workpiece.

2. The method according to claim 1, wherein the pressure is increased after the pilot arc is transferred to the workpiece.

3. The method according to claim 1, wherein the pressure is decreased after the pilot arc is transferred to the workpiece.

4. The method according to claim 1, wherein the pilot arc is generated within the plasma arc torch after switching from the pre-flow gas supply to the plasma gas supply.

5. The method according to claim 1, wherein the pilot arc is generated within the plasma arc torch before switching from the pre-flow gas supply to the plasma gas supply.

6. The method according to claim 1 further comprising directing the pre-flow gas at a first pressure and directing the plasma gas at the first pressure when the pre-flow gas is switched to the plasma gas.

7. The method according to claim 6 further comprising switching the plasma gas from the first pressure to a second pressure after the pilot arc is transferred to the workpiece.

8. The method according to claim 7 wherein the second pressure is higher than the first pressure.

9. The method according to claim 1 further comprising increasing an arc current to a first set value to transfer the pilot arc to the workpiece.

10. The method according to claim 9 further comprising ramping up the arc current from the first set value.

11. The method according to claim 10 further comprising switching the plasma gas from a first pressure to a second pressure when the arc current reaches a second set value that is higher than the first set value.

12. The method according to claim 1, wherein the pre-flow gas is switched to the plasma gas approximately 10 ms-1000 ms before the pilot arc is transferred to the workpiece.

13. The method according to claim 1, wherein the plasma arc torch has a tip orifice smaller than about 0.040 inches.

14. The method according to claim 1, wherein the pre-flow gas is directed at a pressure greater than about 50 psi.

15. The method according to claim 1, further comprising operating the plasma arc torch at a value of between about 4 amps to about 150 amps.

16. The method according to claim 1, wherein the pre-flow gas is selected from a group consisting of argon, nitrogen and air.

17. The method according to claim 1, wherein the plasma gas is oxygen.

18. A method of starting a plasma arc torch for cutting a workpiece, the method comprising:
   providing a pre-flow gas supply and a plasma gas supply from two different gas sources;
   directing the pre-flow gas supply;
   initiating a pilot arc within the plasma arc torch;
   switching from the pre-flow gas supply to the plasma gas supply;
   supplying the plasma gas at a first gas pressure to reduce a time delay when the pre-flow gas is completely replaced with the plasma gas within the plasma arc torch;
   transferring the pilot arc to the workpiece after the pre-flow gas supply is switched to the plasma gas supply; and
   switching the plasma gas from the first gas pressure to a second gas pressure that is higher than the first gas pressure after the pilot arc is transferred to the workpiece.

* * * * *